(12) United States Patent
Stravers

(10) Patent No.: US 6,851,044 B1
(45) Date of Patent: Feb. 1, 2005

(54) SYSTEM AND METHOD FOR ELIMINATING WRITE BACKS WITH BUFFER FOR EXCEPTION PROCESSING

(75) Inventor: Paul Stravers, San Jose, CA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/505,986

(22) Filed: Feb. 16, 2000

(51) Int. Cl.$^7$ ............................................. G06F 15/00
(52) U.S. Cl. ..................... 712/218; 712/220; 712/225; 712/228; 717/100
(58) Field of Search ................................ 712/218, 220, 712/225, 228; 717/100

(56) References Cited

U.S. PATENT DOCUMENTS

| | | | |
|---|---|---|---|
| 5,043,868 A | * 8/1991 | Kitamura et al. | 712/218 |
| 5,163,157 A | * 11/1992 | Yamano et al. | 712/218 |
| 5,222,240 A | 6/1993 | Patel | 395/775 |
| 5,293,499 A | 3/1994 | Jensen | 395/375 |
| 5,636,353 A | * 6/1997 | Ikenaga et al. | 712/218 |
| 5,898,882 A | * 4/1999 | Kahle et al. | 712/23 |
| 2002/0161985 A1 | * 10/2002 | Gearty et al. | 712/1 |

FOREIGN PATENT DOCUMENTS

| | | | |
|---|---|---|---|
| GB | 2241801 | 9/1991 | G06F/9/28 |
| JP | 08212083 | 8/1996 | |
| JP | 09016399 | 1/1997 | |
| WO | WO9621186 | 7/1996 | G06F/9/38 |

OTHER PUBLICATIONS

Findlay, P.A. et al, HARP: A VLIW RISC Processor, CompEuro '91. Advanced Computer Technology, Reliable Systems and Applications. 5th Annual European Computer Conference. Proceedings, pp.: 368–372, May 13–16, 1991.*

The development of iHARP: a multiple instruction issue processor chip, Steven, G.B.; Adams, R.G.; Findlay, P.A.; Trainis, S.A., RISC Architectures and Applications, IEE Colloquium on, 1991, pp.: 2/1–2/5.*

Tenenbaum, Andrew, Structured Computer Organization, Prentice–Hall, Inc., 3rd Ed, pp. 11–12.*

Proceedings of $27^{th}$ Annual International Symposium on Microarchiteture, MICRO 27, San Jose, CA, Nov. 30 –Dec. 2, 1994, IEEE Comput. Soc., Tech. Committee on Microprogramming & Microarchit. (Abstract).

HADES—An asynchronous Superscalar Processor, IEEE Colloquium on Design and Test Asynchronous System, published London, UK, 1996, (Abstract).

* cited by examiner

Primary Examiner—Jeffrey Gaffin
Assistant Examiner—Justin Knapp
(74) Attorney, Agent, or Firm—Michael J. Ure

(57) ABSTRACT

An instruction execution device and method are disclosed for reducing register write traffic within a processor with exception routines. The instruction execution device includes an instruction pipeline for producing a result for an instruction, wherein the exception routines may interrupt the instruction pipeline a random intervals, a register file that includes at least one write port for storing the result, a bypass circuit for allowing access to the result, a means for indicating whether the result is used by only one other instruction, a register file control for preventing the result from being stored in the write port when the result has been accessed via the bypass circuit and is used by only one other instruction, a First in First out (FIFO) buffer for storing the result and a FIFO control for writing the contents of the FIFO buffer to the register file when an exception occurs.

16 Claims, 2 Drawing Sheets

SYSTEM AND METHOD FOR ELIMINATING WRITE BACKS WITH BUFFER FOR EXCEPTION PROCESSING

FIELD OF THE INVENTION

The present invention pertains generally to the field of digital computation circuits, and in particular, the invention relates to a system and method for an instruction execution device for use with a processor with exception routines.

BACKGROUND OF THE INVENTION

General motivational criteria exist for the design of microprocessors, for example, to reduce power consumption and size of such devices and as well reducing overall cost. In particular, one technological development in this regard has been the development of instruction execution architectures that implement a number of simultaneous parallel instructions.

Systems and methods are known that provide instruction execution architectures of the type noted above, for example, microprocessor Instruction Set Architectures (ISAs). Typically, the implementation of such ISAs employs a so-called "pipeline" method to overlap different execution stages of subsequent instructions.

A conventional four-stage pipeline employs a (1) Fetch, (2) Decode, (3) Execute and (4) a Write-back. For data transfer type instructions such as a load instruction, one extra instruction pipeline stage is usually required.

In the first stage of the cycle, the processor fetches an instruction from memory. The address of the instruction to fetch is stored in the internal register, named the program counter, or PC. As the processor is waiting for the memory to respond with the instruction, it increments the PC. This means the fetch phase of the next cycle will fetch the instruction in the next sequential location in memory (unless the PC is modified by a later phase of the cycle).

In the decode phase, the processor stores the information returned by the memory in another internal register, known as the instruction register, or IR. The IR now holds a single machine instruction encoded as a binary number. The processor decodes the value in the IR in order to figure out which operations to perform in the next stage.

In the execution stage, the processor actually carries out the instruction. This step often requires further memory operations; for example, the instruction may direct the processor to fetch two operands from memory (for example, storing them in operand registers), add them and store the result in a third location (the destination addresses of the operands and the result are also encoded as part of the instruction).

In the write-back stage of the pipeline, the result computed upstream in the pipeline is written (retired) to a destination register in a register file.

In another prior art pipeline method, circuitry is provided that allows operand or result values to bypass the register file. Using these bypass circuits, the operands or result values are already available to subsequent instructions before the operand-producing instructions are retired (e.g., written-back to register file).

Lastly, there are many reasons for the regular pipeline flow to be interrupted systematically in a typical processor. The penalty for these disruptions is paid in the form of lost or stalled pipeline cycles. In particular, exception routines or interrupts are many times allowed to interrupt the instruction flow through the pipeline in such a way that a first instruction does not immediately re-enter the pipeline after the exception is completed, while a second instruction that had entered the pipeline subsequent to the first instruction does. Consequently, complexity is added to the pipeline to account for the instruction order change in the pipeline, so that instruction operands and result values operated on appropriately.

There are numerous shortcomings to these types of conventional pipelines. For example, conventional pipeline methods often require a large number of separate registers in a register file to adequately perform numerous simultaneous parallel instructions and store data during interruptions. The large register file, in turn, typically contributes significantly to the overall power consumption and size of the processor.

There thus exists in the art a need for improved systems, methods and techniques to reduce the write traffic to conventional registers within a processor, thereby reducing the over-all power consumption, while compensating for the effect of interruptions in a pipeline architecture.

BRIEF SUMMARY OF THE INVENTION

It is an object of the present invention to address some of the limitations of conventional instruction execution devices within processors, as discussed above.

It is a further object of the invention to provide a processor instruction set architecture that reduces the number of register file write operations in a pipeline method while accounting for the effect of interruptions in a pipeline architecture; advantageously, in turn, allowing for the possibility of reducing the overall power consumption of the processor.

The shortcomings associated with register write traffic in a processor are reduced or overcome by an arrangement in accordance with the principles of the present invention in which an instruction execution device is provided. The instruction execution device includes an instruction pipeline for producing a result for an instruction, wherein exception routines may interrupt the instruction pipeline at random intervals; a register file that includes at least one write port for storing the result, a bypass circuit for allowing access to the result, wherein an indication is provided to a register file control as to whether the result is used by only one other instruction, and the register file control prevents the result from being stored in the write port when the result has been accessed via the bypass circuit and is used by only one other instruction, a First-In-First-Out (FIFO) buffer for storing the result and a FIFO control for writing the contents of the FIFO buffer to the register file when an exception occurs.

In one embodiment of the present invention, the indication whether the result is used by only one other instruction includes encoding each instruction. For example, a so-called "dead value" field is designated in the "opcode" of each instruction to indicate whether the result will be used by only one other instruction.

In another embodiment of the invention, the means for indicating whether the first result is used by only the second instruction includes the instruction pipeline determining whether a result of an instruction in the instruction pipeline and another result of another instruction in the instruction pipeline are designated for storage in the same write port in the register file. Since the write port in the register file is "reused" by a subsequent instruction already in the instruction pipeline, this is used to indicate that the first result will be used by only one other instruction.

These and other embodiments and aspects of the present invention are exemplified in the following detailed disclosure.

BRIEF DESCRIPTION OF DRAWINGS

The features and advantages of the present invention can be understood by reference to the detailed description of the preferred embodiments set forth below taken with the drawings, in which.

DETAILED DESCRIPTION OF THE PREFERRED EMBODIMENTS

Some portions of the detailed descriptions that follow are presented in terms of programs or algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical, magnetic or optical signals capable of being stored, transferred, combined, compared, and otherwise manipulated.

Figure 1:
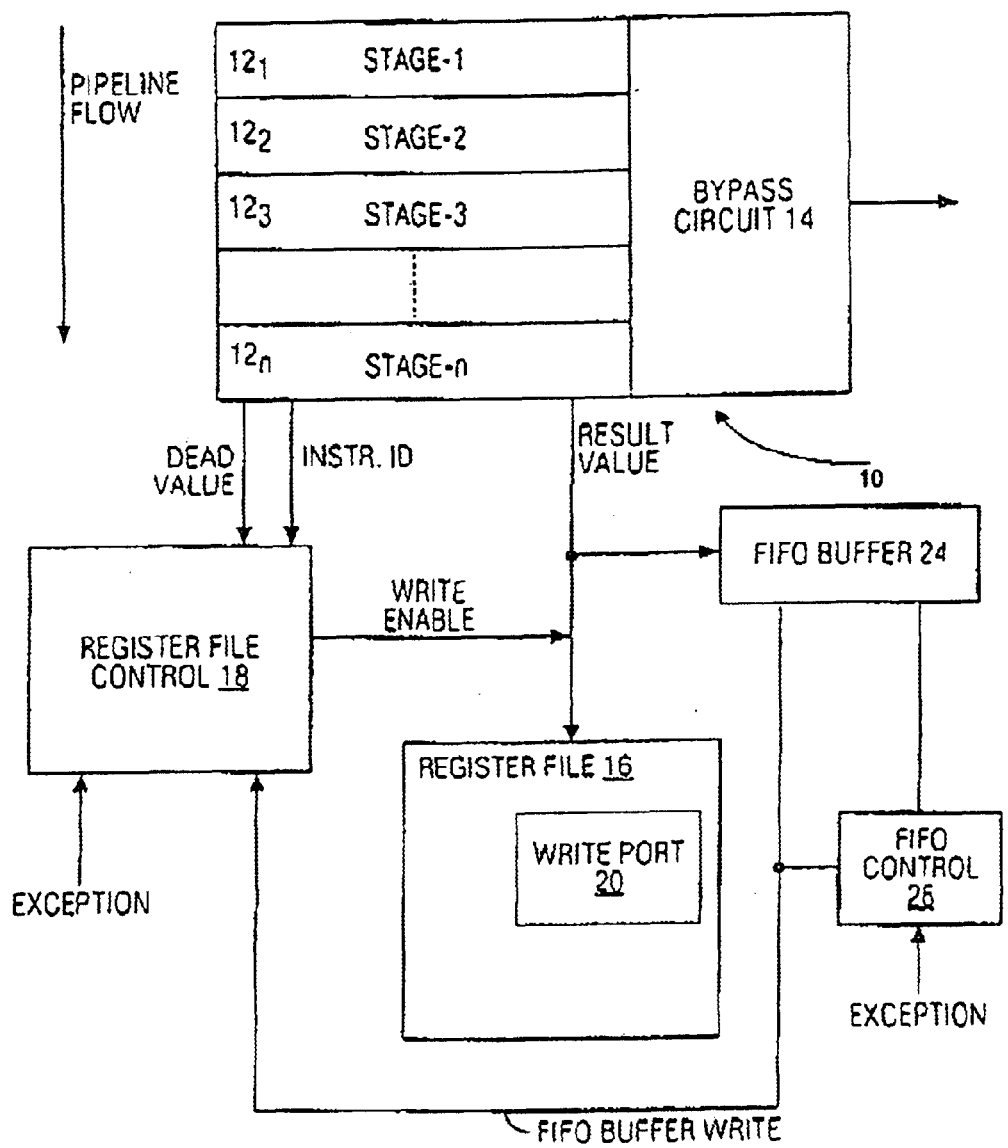
FIG. 1 is a block diagram of one illustrative arrangement of an instruction execution device in accordance with the teachings of the present invention.

Referring now to FIG. 1, a block diagram is shown illustrating one embodiment of an instruction execution device in accordance with the teachings of the present invention. It will be recognized that FIG. 1 is simplified for explanation purposes and that the full processor environment suitable for use with the invention will comprise, for example, cache memory, RAM and ROM memory, compiler or assembler, I/O devices, etc., all of which need not be shown here. Generally, instruction execution device 10 uses an n-stage pipeline instruction set register architecture (ISA) $12_1$, through $12_n$ (hereinafter collectively known as "pipeline 12"), a conventional bypass circuit 14, a register file 16, a register file control 18, a First in First out (FIFO) buffer 24 and a FIFO buffer control 26.

The pipeline 12 includes a number of pipeline stages (for example, Fetch, Decode, Execute and Write-back), which are stored in registers $12_1$ through $12_n$. Unlike conventional pipelines, pipeline 12 also includes a "consumer-id" field in the pipeline stage registers and its use is explained in more detail below. It should be understood, however, that the invention is not limited to particular pipeline architecture. For example, the stages in a pipeline may include: instruction fetch, decode, operand fetch, ALU execution, memory access and write back of the operation results. Moreover, the chain of stages in the pipeline can be subdivided more finely or combined. The number of stages in the pipeline is an architectural feature which can be changed according to the intended exploitation of instruction level parallelism.

Register file 16 includes at least one addressable destination write port 20 for storing data. As will be understood by persons skilled in the art, the register file can be any conventional database/indexing storage means that can store and allow access to records/data.

Register file control 18 contains the majority of logic, control, supervisory, translation functions required for controlling the operation of writing-back data to register file 16. As described in detail below, execution of instructions implements the functionality necessary to reduce the number of registers required for file write operations in the pipeline.

Instructions can be classified as one of three major types: arithmetic/logic, data transfer, and control. Arithmetic and logic instructions apply primitive functions of one or two arguments, for example, addition, multiplication, or logical AND.

The timing of each stage depends on the internal construction of the processor and the complexity of the instructions it executes. The quantum time unit for measuring operations is known as a clock cycle. The logic that directs operations within a processor is controlled by an external clock, which, for example, may be a circuit that generates a square wave with a fixed period. The number of clock cycles required to carry out an operation determines the amount of time it will take.

I have observed that a large number of instructions produce a result value that is only consumed by a single instruction later in an algorithm, for example, an other instruction that enters the pipeline subsequently, (I will refer to the former instruction as the "producer" and to the latter as the "consumer"). Further, an analysis of the register data flow in the SPEC benchmarks revealed that 70% of all integer results and 80–99% of all floating point results are only consumed once, see an article written by M. Franklin et al., entitled "Register Traffic Analysis for Streamlining Inter-Operation Communication in Fine Grain Parallel Processors" published in *The 25th Annual International Symposium on Microarchitecture (MICRO-25)*, pages 236–245, in December 1992. Furthermore, in a very large number of cases the consumer enters the pipeline architecture before the producer retires. This holds even stronger for specific types of processors, such as superscalar and VLIW processors. Accordingly, the consumer obtains the result value through a method other than the register file, for example, the bypass circuit. However, the result is nevertheless written-back to the register file.

More importantly, I have realized that the result value of the producer in such a situation does not have to be retired to the register file, since it will not be used by any other consumer. The result value of the producer effectively becomes a "dead value" as soon as it has been bypassed to the consumer. Thus, in accordance with one aspect of the invention, the register file control 16 determines whether a particular instruction will be used by more than one consumer and, if so, the result is written-back to register file 16 in stage-n, for example, the Write-Back stage. In either case the result (which includes the write data, destination address and consumer-id) is temporarily stored in FIFO buffer 24.

In the illustrative embodiment of FIG. 1, explicit encoding in each instruction is used to indicate whether the result value of a particular instruction will be used by only one consumer (or by only other consumers in the pipeline). Preferably, a dedicated "dead value" bit in the instruction encoding (the so-called "opcode" of an instruction) is used, which is set or cleared by a compiler or assembler (not shown), depending on the degree of consumption. If the dead value bit is set, then the result value is not written-back (for example, via a write-enable signal) to register file 16 in stage-n of pipeline 12, but is stored in FIFO buffer 24. In particular, the dead value bit, as well as the instruction-id of the associated instruction, is provided to register file control 18, which in turn controls register file 16 via a write-enable signal to write-back the result value or not. Alternatively, if a dedicated bit is unavailable, then a few commonly used instructions can be selected (e.g., ADD and LOAD), which are assigned an alternative opcode to indicate the degree of consumption.

By storing the result in FIFO buffer 24, the invention accounts for the effects of exceptions that are allowed to interrupt the instruction flow through the pipeline. Exceptions can disrupt the instruction flow in such a way that the producer does not re-enter the pipeline after the exception is handled while the consumer does. When the consumer re-enters the pipeline after the exception routine finishes, it will read its operands from register file 16 because now the producer is not downstream of the consumer in the pipeline anymore. But since the producer had not updated register file 16 before the exception occurred, the consumer reads stale data from register file 16, and as a consequence the program behaves incorrectly.

Certain pipeline architectures, such as the Trimedia ISA, do not allow interrupts to be taken at random points in the instruction flow. Instead, the ISA provides special instructions that cause the CPU to synchronize with pending exceptions. As long as the producer and the consumer are not separated by such instructions, no harm can be done and it is safe to discard dead values.

However, the MIPS (Microprocessor without Interlocking Pipeline Stages) ISA and most other conventional ISAs do not allow application programs to decide when the processor should synchronize with pending exceptions. As a result, exceptions can disrupt the instruction flow in such a way that the producer does not re-enter the pipeline after the exception is handled while the consumer does.

In operation, FIFO buffer 24 stores the results of each instruction at the tail of the FIFO buffer 24. Again, the result includes the write data, destination address of register file 16 and consumer-id from the pipeline stage register that uniquely identifies a consumer.

FIFO control 26 continuously monitors the flow of retiring instructions and compares their identity to the "consumer-id" at the head of FIFO 24. Whenever it detects a match, it so-called "pops" the head from FIFO buffer 24 and discards its value.

However, during an exception, FIFO control 26 writes the content of FIFO buffer 24 to register file 16, starting with the head and progressing to the tail, until FIFO 24 is empty. As will be understood by persons skilled in the art, the FIFO buffer write operation can be performed in a variety of ways, for example, via the register file control or a direct connection to the register file. Thereafter a consumer will read the correct data from register file 16 after the exception routine finishes.

Figure 2:
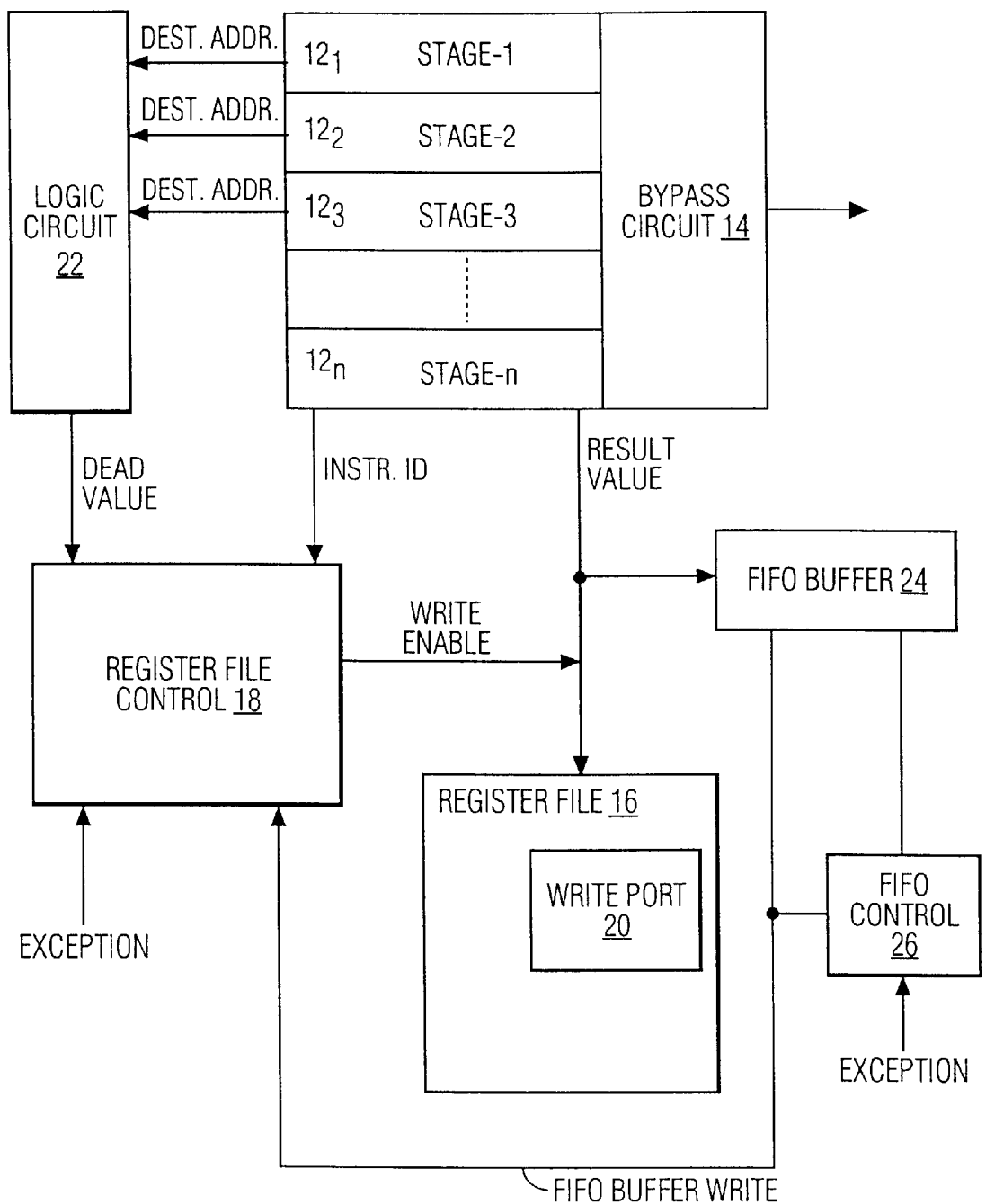
FIG. 2 is a block diagram of another illustrative arrangement of an instruction execution device in accordance with the teachings of the present invention.

In another illustrative embodiment shown in FIG. 2, implicit encoding in each instruction is used to indicate whether the result value of a particular instruction will be used by only one consumer (or other consumers in the pipeline). Specifically, pipeline 12 determines whether another instruction in the pipeline, will use the same destination address (e.g., write port 20) in register file 16, as a subsequent instruction in the pipeline. This can be determined in a number of ways. For example, if the result value of the instruction in stage-3 $12_3$ is designated for the destination address of write port 20 in register file 16 and the result value of the instruction in stage-1 $12^1$ is also designated for the same destination address in register file 16, then the result value of the instruction in stage-3 is "dead" because its destination address will be reused by another instruction in the pipeline. In other words, only one consumer will use the result value. Alternatively, this method is also used when more than one consumer (in the pipeline) uses the result value. For example, if the result value of the instruction in stage-n $12_n$ is designated for the destination address of write port 20 in register file 16 and the result value of the (upstream) instruction in stage-1 $12^1$ is also designated for the same destination address in register file 16, then the result value of the instruction in stage-n is "alive" in stage-2 through stage n-1, but is "dead" in stage-1. In this manner, the result value can be used by numerous consumers while "alive". Accordingly, once a result value is "dead", it does not get written-back to register file 16.

In the illustrative embodiment of FIG. 2, conventional gate and logic circuits 22, for example, OR gates, are used to provide a dead value bit, as shown in FIG. 2, to the register file control 18. The instruction-id of the associated instruction is also provided to register file control 18. However, as is well known in the art, in micro-architectures that support register renaming, gate and logic circuits are not required, since such a processor already includes a mechanism to detect register reuse.

A reduction in power consumption is dependent on the actual properties of the implementation technology. For instance, the data in the FIFO buffer is only stored there for a few clock cycles before it gets discarded. With this in mind, it may be possible to store the data in the FIFO buffer as dynamic charges with no refresh facilities. This could reduce the area complexity of the FIFO buffer significantly, which would be particularly advantageous for processors that exploit a high degree of instruction-level parallelism and which consequently must be able to retire many instructions per clock cycle.

The following merely illustrates the principles of the invention. It will thus be appreciated that those skilled in the art will be able to devise various arrangements which, although not explicitly described or shown herein, embody the principles of the invention and are included within its spirit and scope. Moreover, all statements herein reciting principles, aspects and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

In the claims hereof any element expressed as a means for performing a specified function is intended to encompass any way of performing that function including, for example, a) a combination of circuit elements which performs that function or b) software in any form, including, therefore, firmware, microcode or the like, combined with appropriate circuitry for executing that software to perform the function. The invention as defined by such claims resides in the fact that the functionalities provided by the various recited means are combined and brought together in the manner which the claims call for. Applicant thus regards any means which can provide those functionalities as equivalent as those shown herein.

What is claimed is:

1. An instruction execution device for use in a processor with an exception routine, the instruction execution device comprising:
   an instruction pipeline for producing a first result for a first instruction, wherein the exception routine interrupts the instruction pipeline at random intervals;
   a register file connected to the instruction pipeline, the register file including at least a first write port for storing the first result;
   a bypass circuit connected to the instruction pipeline, the bypass circuit for allowing access to the first result;

means for indicating whether the first result is used by only a second instruction that includes determining whether an instruction subsequent to the second instruction in the pipeline designates a same destination address for storage in the resister file as that of the first result;

a register file control connected to the instruction pipeline and the register file, the register file control for preventing the first result from being stored in the write port when the first result has been accessed via the bypass circuit and is used by only the second instruction;

a buffer that is not a part of the register file, said buffer only for storing the first result from the pipeline after being accessed by the second instruction via the bypass circuit; and a buffer control for writing the first result from the buffer to the register file when an exception occurs.

2. The instruction execution device of claim 1, wherein the processor comprises a microprocessor without interlocking stages.

3. The instruction execution device of claim 1, wherein the buffer is a First-In-First-Out buffer.

4. The instruction execution device of claim 1, wherein the instruction pipeline has a plurality of stages.

5. The instruction execution device of claim 4, wherein the instruction pipeline processes a plurality of instructions in the plurality of stages.

6. The instruction execution device of claim 1, wherein the means for indicating whether the first result is used by only the second instruction includes encoding the first instruction to indicate whether the first result will be used by only the second instruction.

7. The instruction execution device of claim 6, wherein encoding the first instruction includes designating a field in the opcode of the first instruction to indicate whether the first result will be used by only the second instruction.

8. The instruction execution device of claim 7, wherein each instruction is encoded to indicate whether its respective result is used by only one other instruction.

9. The instruction execution device of claim 5, wherein the means for indicating whether the first result is used by only the second instruction includes the instruction pipeline determining whether the first result of the first instruction in the instruction pipeline and a second result of the second instruction in the instruction pipeline are designated for storage in the first write port in the register file.

10. The instruction execution device of claim 9, wherein the means for indicating whether the first result is used by only the second instruction further includes gate and logic circuits.

11. A method of executing an instruction in a processor with an exception routine, the method comprising the steps of:

generating a first result from a first instruction using an instruction pipeline, wherein the exception routine interrupts the instruction pipeline at random intervals;

allowing access to the first result using a bypass circuit;

determining whether the first result is used by only a second instruction in the instruction pipeline by determining whether an instruction subsequent to the second instruction in the pipeline designates a same destination address for storage in the resister file as that of the first result;

preventing the first result from being stored in a register file and storing the first result from the pipeline in a buffer that is not part of the register file when the first result has been already accessed by the second instruction and is used by only the second instruction; and writing the first result from the buffer to the register file when an exception occurs.

12. The method of claim 11, wherein the determining step includes encoding the first instruction to indicate whether the first result will be used only by the second instruction.

13. The method of claim 11, wherein the determining step includes the instruction pipeline determining whether the first result of the first instruction in the instruction pipeline and a second result of the second instruction in the instruction pipeline have the same storage address in the register file.

14. A computer-readable memory medium including code for processing an instruction on a device with an exception routine, the code comprising:

instruction pipeline code for generating a first result from a first instruction;

access allowing code to the first result, while the first is in the instruction pipeline;

indicating code for identifying whether the first result is used by a second instruction in the instruction pipeline;

preventing code to prevent storage of the first result from being stored in a register file and storing the first result from the pipeline in a buffer apart from the register file when the first result has been accessed and is used by only the second instruction, by providing code that determines whether an instruction subsequent to the second instruction in the pipeline designates a same destination address for storage in the register file as that of the first result; and transferring code for writing the first result from the buffer to the register file when the exception routine occurs.

15. The memory medium according to claim 14, wherein the indicating code includes encoding the first instruction to indicate whether the first result will be used by only the second instruction.

16. The memory medium according to claim 14, wherein indicating code includes the instruction pipeline determining whether the first result of the first instruction in the instruction pipeline and a second result of the second instruction in the instruction pipeline have the same storage address in the register file.

* * * * *